(12) United States Patent
Williames

(10) Patent No.: US 6,698,366 B2
(45) Date of Patent: Mar. 2, 2004

(54) FIELD PLANTING SHOES

(75) Inventor: Geoffrey Alan Williames, Warragul (AU)

(73) Assignee: Williames Hi-Tech International Pty Ltd., Warragul (AU)

( * ) Notice: Subject to any disclaimer, the term of this patent is extended or adjusted under 35 U.S.C. 154(b) by 0 days.

(21) Appl. No.: 10/133,548

(22) Filed: Apr. 26, 2002

(65) Prior Publication Data
US 2002/0166485 A1 Nov. 14, 2002

(30) Foreign Application Priority Data
Apr. 26, 2001 (AU) .............................................. PR4585

(51) Int. Cl.$^7$ .......................... A01C 11/00; A01C 11/02
(52) U.S. Cl. ...................................................... 111/100
(58) Field of Search ................................ 111/100, 101, 111/102, 103, 104, 105, 106, 107, 109, 111, 114, 89, 90, 91, 92, 93, 94, 95, 96; 47/1.01 R, 1.01 T, 901

(56) References Cited

U.S. PATENT DOCUMENTS 4,388,035 A 6/1983 Cayton et al.
4,443,151 A 4/1984 Armstrong et al.
4,893,571 A 1/1990 Hakli et al.

FOREIGN PATENT DOCUMENTS

| AU | 484946 | 7/1977 |
| AU | A-75851/94 | 12/1994 |
| EP | 612 466 A1 | 8/1994 |
| FR | 2575030 | 6/1986 |
| GB | 2125757 | 3/1984 |

Primary Examiner—Christopher J. Novosad
(74) Attorney, Agent, or Firm—John K. McCulloch

(57) ABSTRACT

A field planting device 1 adapted to pass along a ground furrow into which plants are to be sequentially placed during a planting operation, the device including: a plant receiving tube 3 defining at least an upper portion of a tubular internal space 60 adapted to receive and hold in an upright condition a plant 8 to be planted, with a root mass plug 10 of the plant in a lower portion of said space 60 and foliage 9 of the plant in the upper portion of the space, the space being partly defined by rear internal walls 50 on laterally opposing sides of an upright rearwardly facing slot 18, 22 through which slot the plant passes when being ejected during a planting operation; and
a plant pusher member 4 actuated by a drive member 12, the pusher member 4 adapted to engage both the foliage and the root mass plug of the plant 8 when the pusher member 5 is moved rearwardly and to eject the plant 8 through the slot 18, 22.

20 Claims, 12 Drawing Sheets

FIELD PLANTING SHOES

BACKGROUND OF THE INVENTION

1. Field of the Invention

The present invention relates to improvements in field planting devices.

2. Description of the Relevant Art

Generally, most planting mechanisms consist of an open backed plant containment shoe which can produce inaccurately placed plants. This can be remedied by the use of "guillotine" and "saloon" type doors as shown in co-pending International Patent Application No. PCT/AU97/00893 and U.S. patent application Ser. No. 09/603,268.

Use of these doors requires complicated electronics and pneumatics and many moving parts.

The purpose of this invention is to eliminate as many moving parts as possible and to simplify the way that plants are planted.

SUMMARY OF THE INVENTION

Accordingly, the present invention provides a field planting device adapted to pass along a ground furrow into which plants are to be sequentially placed during a planting operation, said device including:

a plant receiving tube defining at least an upper portion of a tubular internal space adapted to receive and hold in an upright condition a plant to be planted, with a root mass plug of said plant in a lower portion of said space and foliage of said plant in the upper portion of the space, the space being partly defined by rear internal walls on laterally opposing sides of an upright rearwardly facing slot through which slot the plant passes when being ejected during a planting operation; and a plant eject mechanism including a pusher member actuated by a drive means, the pusher member adapted to engage both the foliage and the root mass plug of the plant when the pusher member is moved rearwardly and to eject the plant through the slot.

Preferably, the pusher member includes at least one pair of foliage engaging surfaces adapted to engage the plant foliage during ejection of the plant, each of said pair of foliage engaging surfaces extending transversely outwardly in an opposite direction from the other of said pair and each of said pair extending in a rearward direction, and wherein at least a part of each said pair of surfaces traverses the said internal space during ejection of the plant.

In a second aspect, the present invention provides a field planting device including:

a support frame member having an upright plant receiving tube releasably connected to a rearward end region of the support frame member;

a planting shoe member releasably connected to a lower end of said plant receiving tube with a rearward end of said planting shoe member being configured to form a lower extension of said plant receiving tube;

a pusher means;

drive means for effecting fore and aft movement of said pusher means relative to said support frame member;

said pusher means including an upper section adapted in use to move at least partially through the plant receiving tube and a lower section adapted in use to move at least partially through the lower extension of said plant receiving tube formed in said shoe member thereby to eject a plant from said plant receiving tube.

The unique capabilities of the field planting shoe as disclosed hereinafter include:

The ability to mechanically contain a plant and keep it in a vertical position prior to and during the plant eject cycle without additional moving containment doors.

The ability to enable the positioning and planting of small short plants (e.g. lettuce) through to tall large plants (e.g. broccoli and cabbage).

One mechanical action of plant ejection serves four functions:

1. The eject mechanism in this invention pushes the plug from the containment area precisely into the soil;
2. The eject mechanism accurately holds the plug in position;
3. The eject mechanism centralizes the plant foliage and folds it inwardly to a centrally aligned vertical slot and expels the plug precisely vertical;
4. The eject mechanism engages on the foliage of both short and long plants therefor eliminating the need for different ejection devices for different types of plants.

The planting shoe is self cleaning.

The complete mechanism is modular in construction, allowing quick easy disassembly and re-assembly with the minimum of tools required.

BRIEF DESCRIPTION OF THE DRAWINGS

The invention will now be described in detail with reference to the presently preferred embodiment illustrated in the accompanying drawings. It is to be understood, however, that the invention is not limited to the precise arrangements shown therein. In the drawings.

DETAILED DESCRIPTION OF THE PREFERRED EMBODIMENTS

Figure 1:
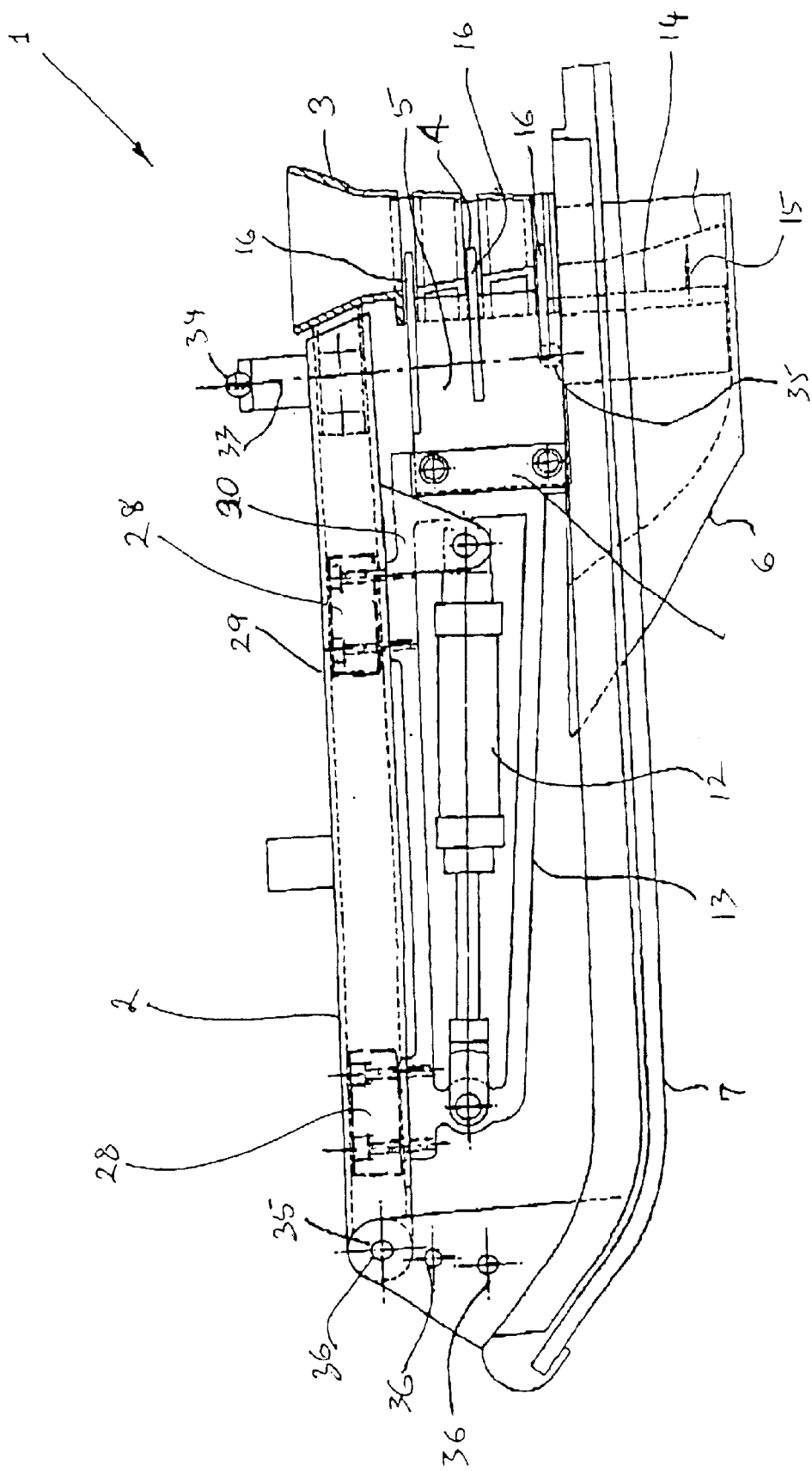
FIG. 1 is a side elevation of a field planting device according to the invention, shown partly in section, the device being shown in a condition of readiness for receiving a plant to be planted.
Figure 11:
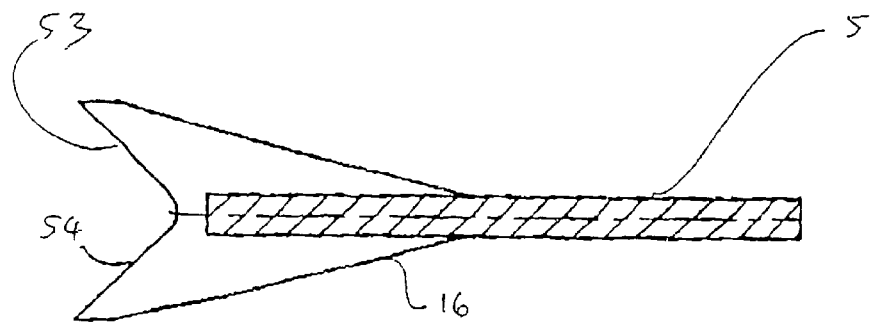
FIG. 11 is a cross-sectional view of the pusher member taken at station 11—11 in FIG. 8.

FIGS. 1 and 11 show side and rear views respectively of the preferred embodiment of a field planting device 1 according to the invention.

The device consists of five main components as follows:
1. Support frame 2 which in use is connected to the remainder of a transplanting machine (not shown);
2. Plant tube 3;
3. Pusher member 4 including a guide plate 5;
4. Shoe 6; and
5. Ski assembly 7.

In use, the device 1 is moved across a soil surface (not shown) the ski assembly 7 riding on or close to the surface, and shoe 6 passing through the soil, producing a furrow into which plants are placed.

FIG. 1 shows the plant eject mechanism 4 in a condition wherein pusher member 4 is retracted from tube 3 in readiness for a plant to be placed in the tube 3 for planting.

Figure 2:
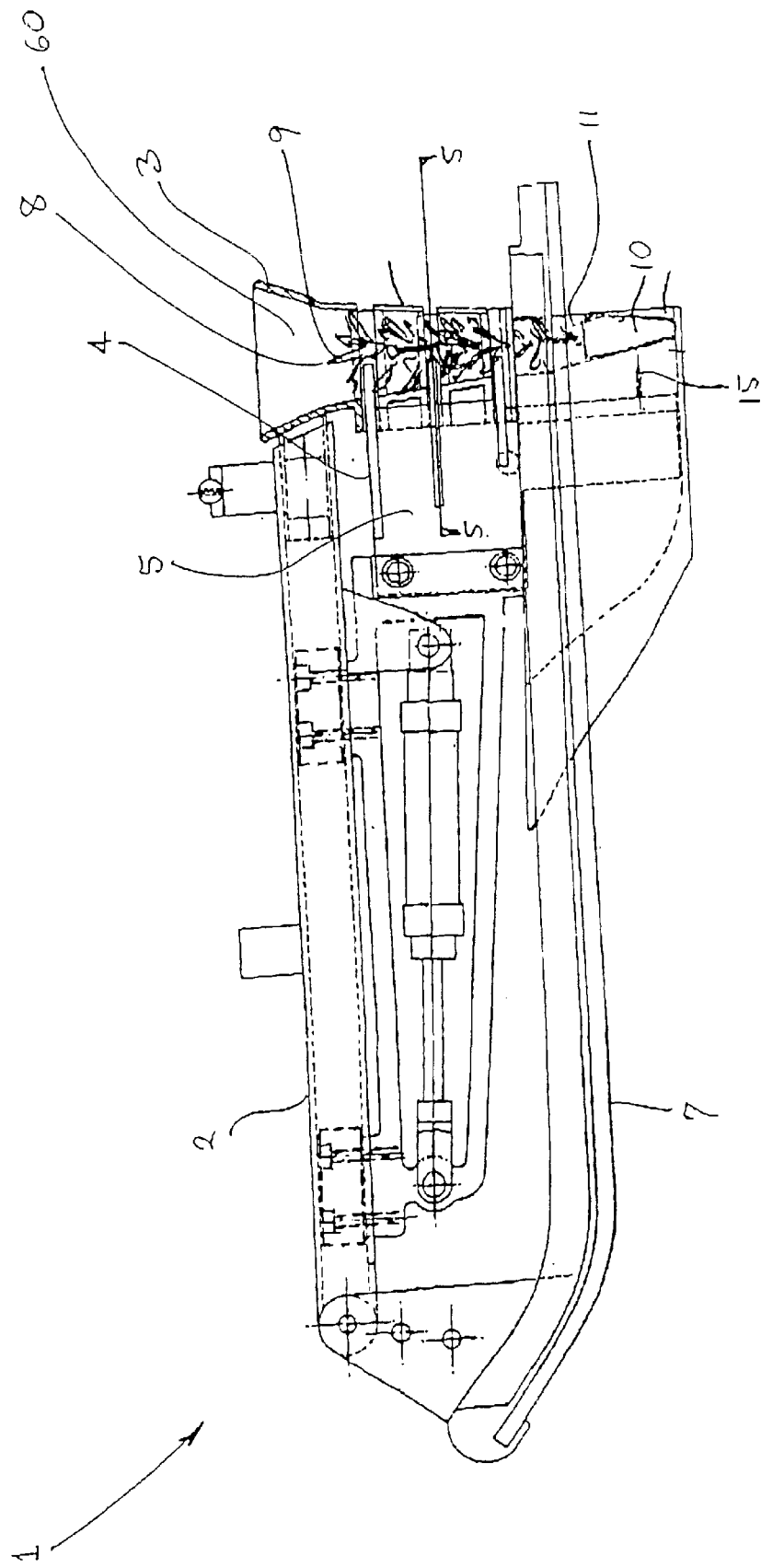
FIG. 2 is a partly-sectioned side elevation of the field planting device shown in FIG. 1, with a plant in position for planting.

As shown in FIG. 2, a plant 8 may be dropped downwardly into the plant tube 2 coming to rest in a plant receptacle 11 in the base of the shoe 6. FIGS. 1 and 2 are partially sectioned views, plant tube 3 being shown sectioned along its longitudinal centerline, so that plant 8 is visible in FIG. 2. The interior of tube 3 and receptacle 11 are respectively upper and lower portions of a genmerally tubular internal space 60 within which plant 8 is held.

Figure 3:
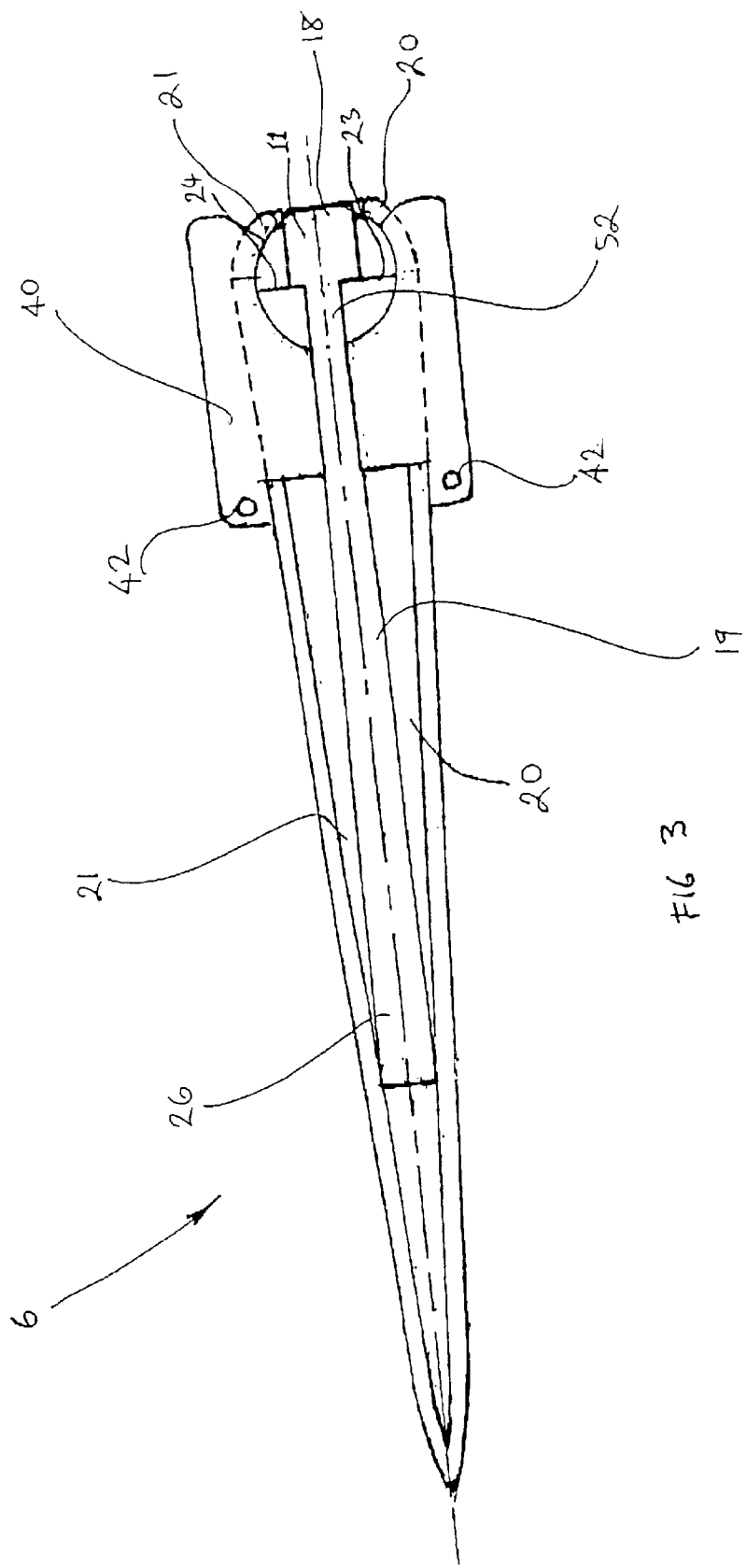
FIG. 3 is a plan view of a shoe of the device shown in FIG. 1.

FIG. 3 shows the shoe 6, only, in plan view. As further explained below, the shoe is secured to the lower end of plant tube 3. The plant receptacle 11 is a space within, and at the rear of, the shoe 6 below plant tube 3. Both the rear of shoe 6 and plant tube 3 are so shaped internally that the foliage 9 and root mass 10 of plant 8 are retained until they are ejected rearwardly as described below, thereby eliminating the need for rearwardly opening doors or the like to retain plant 8 prior to ejection from tube 3. Specifically, sidewalls 20 and 21 of shoe 6 curve inwardly towards each other at their rear end to define a vertically extending slot 18, and a vertically extending slot 22 at the rear of plant tube 3 extends slot 18 upward. The forward side of receptacle 11 is defined by formations 23 and 24, which have therebetween a slot 52 through which guide plate 5 can pass. The width and shape of the slots 18 and 22 are such that plants 8 are retained in tube 3 and shoe 6 until pushed rearwardly through the slots 18 and 22 by pusher member 4, but suffer little or no damage to the root mass 10 and foliage 9. This arrangement avoids the use of complicated door mechanisms such as those in prior art systems mentioned above. The inwardly curving shape of the rear of the shoe 6 also assists early closure of soil around newly ejected plants 8.

Figure 4:
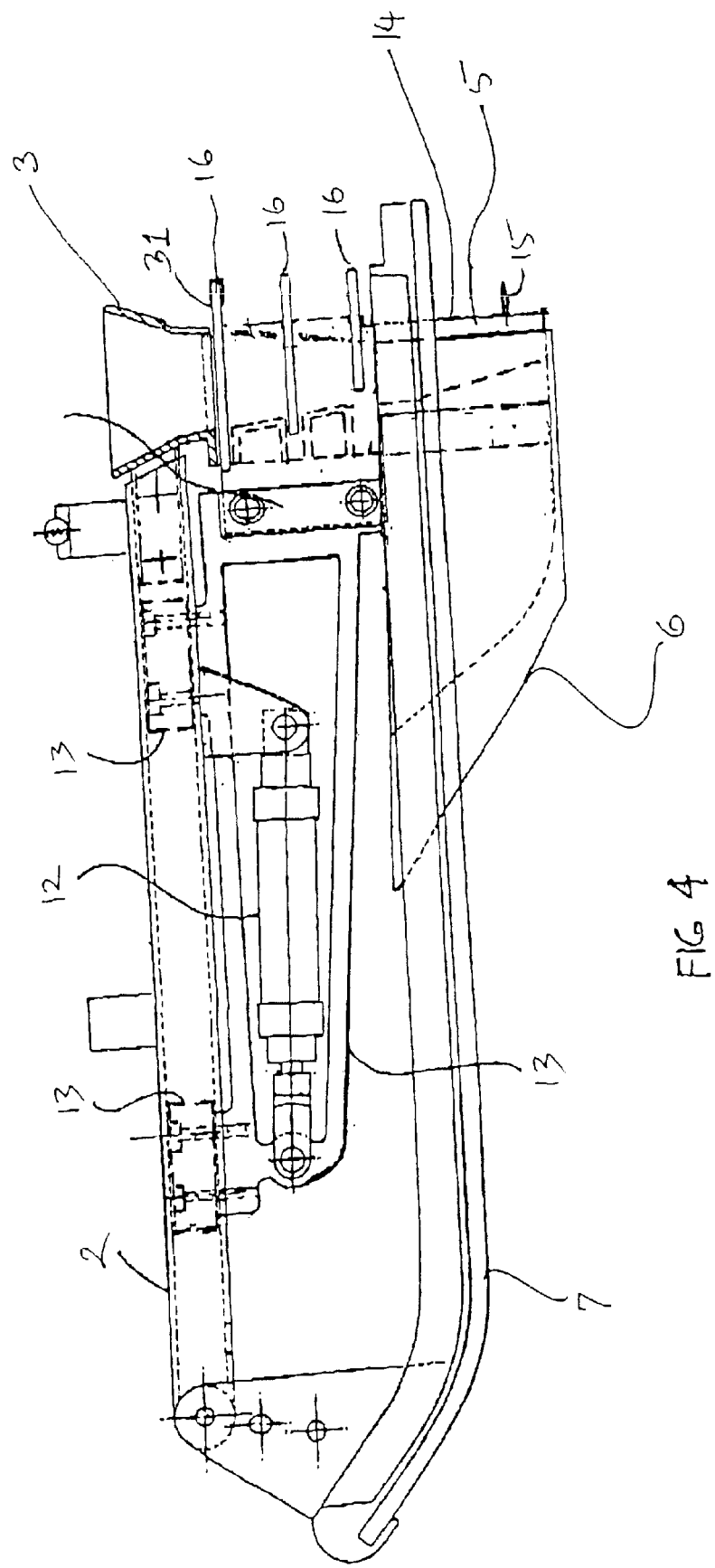
FIG. 4 is a partly-sectioned side elevation of the field planting device shown in FIG. 1, shown in a condition after planting of a plant.

FIG. 4 shows the device 1 after plant 8 has been planted. Once plant 8 is in position for planting (as in FIG. 2), a pneumatic cylinder 12 is actuated which slides rearwardly a sliding frame 13 and the pusher member 4 which is secured thereon. A rear vertical face 14 of the guide plate 5 contacts the root mass 10 and foliage 9 of plant 8 and a sharpened pin 15 located near the base of guide plate 5 penetrates the root mass 10 and holds plant 8 in position, stopping it from rotating and holding it vertically during ejection. The foliage 9 of plant 8 is also contacted during ejection from tube 3 by foliage guides 16 as disclosed further below. The pusher member 4 retains and guides the root mass 10 and foliage 9 until plant 8 has been planted and the pusher member 4 has been retracted.

Figure 5:
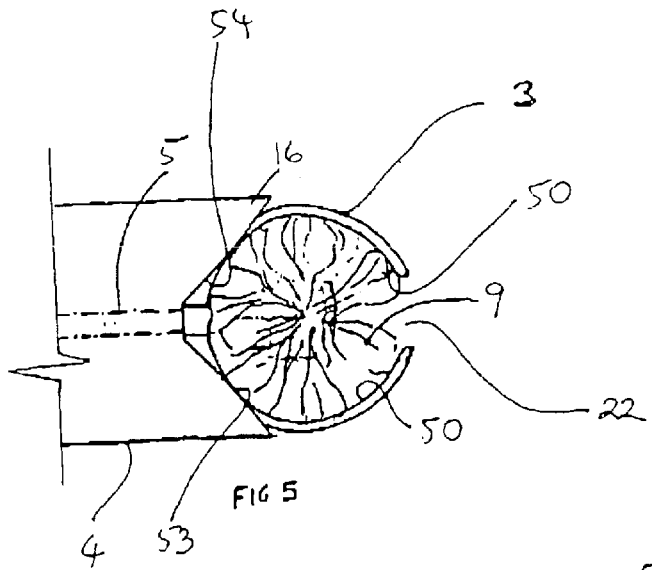
FIG. 5 is a cross-sectional view of the plant tube and a pusher member, only, of the device shown in FIG. 1, taken at station 5—5 in FIG. 2.
Figure 6:
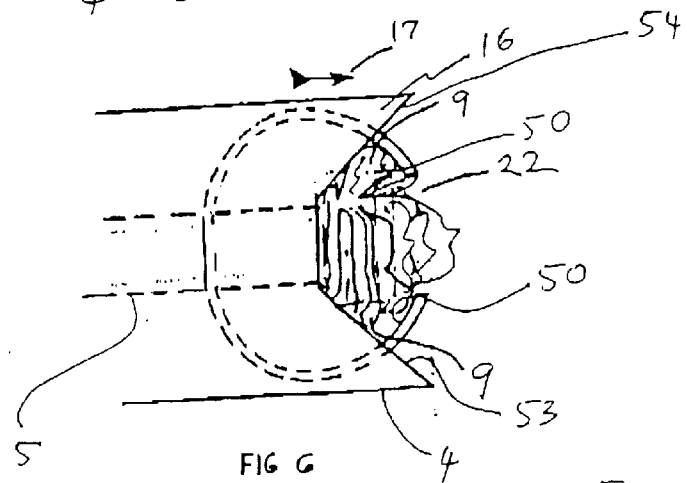
FIG. 6 is a cross-sectional view of the plant tube and pusher member only of the device shown in FIG. 1, taken at station 5—5 in FIG. 2 during planting of a plant.

FIG. 5 (from which non-relevant mechanical detail has been omitted for clarity) shows plant 8 in plant tube 3 with the pusher member 4 fully retracted from the plant tube 3 (i.e. as in FIG. 1 and FIG. 2) and showing foliage 9 of plant 8 being retained within tube 3. FIG. 6 shows the same items as FIG. 5, and from the same viewpoint, but during ejection of plant 8 from tube 3 through slot 22 (i.e. during planting). During ejection of plant 8, rear-facing surfaces 53 and 54 of the foliage guides 16 cooperate with rear internal surfaces 50 of the tube 3 and receptacle 11 to gather, guide and compress the foliage 9, without significant damage thereto in a rearward direction as shown by arrow 17 until the foliage guides 16 have gathered the foliage 9 together and, with the guide plate 5, expelled the plant 8 through vertical slots 18 and 22 at the rear of the plant tube 3 and shoe 6. It will be noted that the curved shapes of the interior surfaces of tube 3 and of receptacle 11 on either side of the slots 18 and 22, extending outwardly and being angled forward from the slots 18 and 22 assist in avoiding damage to the plant 8, particularly the foliage 9. (These surfaces could be modified if needed, for example to be curved differently or even to be flat, while still tapering inward to the slots 18 and 22. Moreover, the widths of slots 18 and 22 may be made variable with height as required to suit plants 8. For example, slot 22 may be wider than slot 18 for easier passage therethrough of foliage 9.)

The pusher member 4 reaches the position shown in FIG. 4 when plant 8 has fully left tube 3. Pusher member 4 is then retracted (to the position shown in FIG. 1 and FIG. 5) by cylinder 12 moving sliding frame 13 forward. Guide plate 5 moves forward in slot 52 during retraction.

Figure 7:
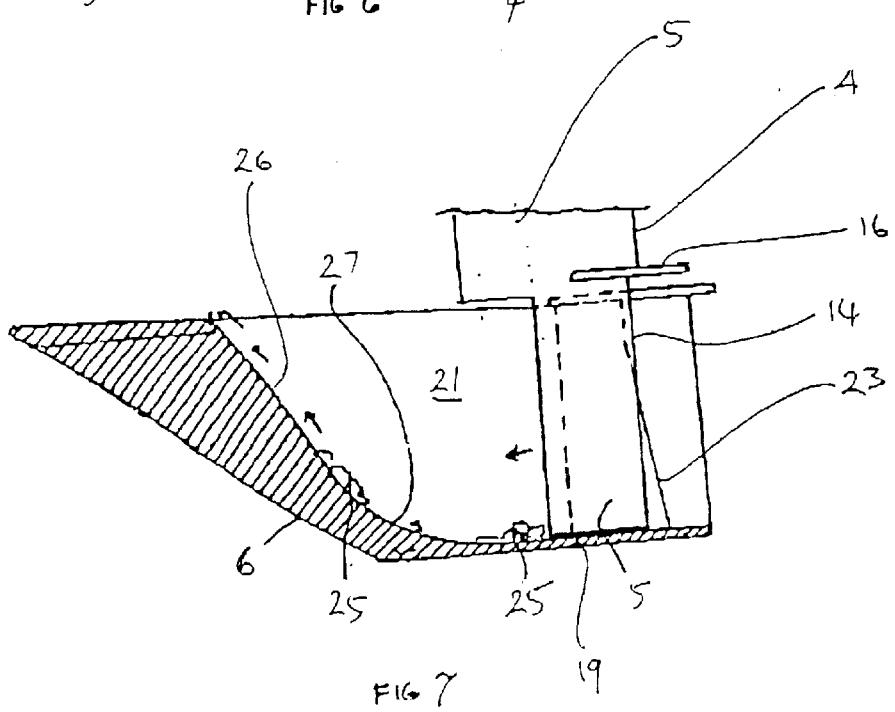
FIG. 7 is a cross-sectional view of the shoe shown in FIG. 3, taken on its longitudinal centerline, also showing a part of the pusher member.

As can be seen in FIG. 3, shoe 6 has a bottom plate 19 that progressively increases in width from rear to front. This allows for self cleaning action of the guide plate 5. Referring to FIG. 7, as guide plate 5 is repeatedly retracted (i.e. moves forwardly) into shoe 6, any soil 25 in the shoe is gradually pushed up sloping inside plate 26 of shoe 6 and the steeply sloping side plates 20 and 21, and out over the top of the shoe 6. The tapered shape of plate 19 and the slope and radius 27 of inside plate 26, assist in this cleaning action. When moving rearwardly through slot 52, the guide plate 5 scrapes clean any soil that has been dragged into the shoe 6 from outside.

The sliding frame 13 is guided by two slider blocks 28, preferably made of a low-friction material requiring no lubricant, such as a suitable grade of polyethylene. Blocks 28 are bolted to the sliding frame 13 and can slide forwardly and rearwardly within channel-section members 29 of the support frame 2. Pneumatic cylinder 12 is pinned to frame 13 and to a bracket 30 on frame 2.

Figure 8:
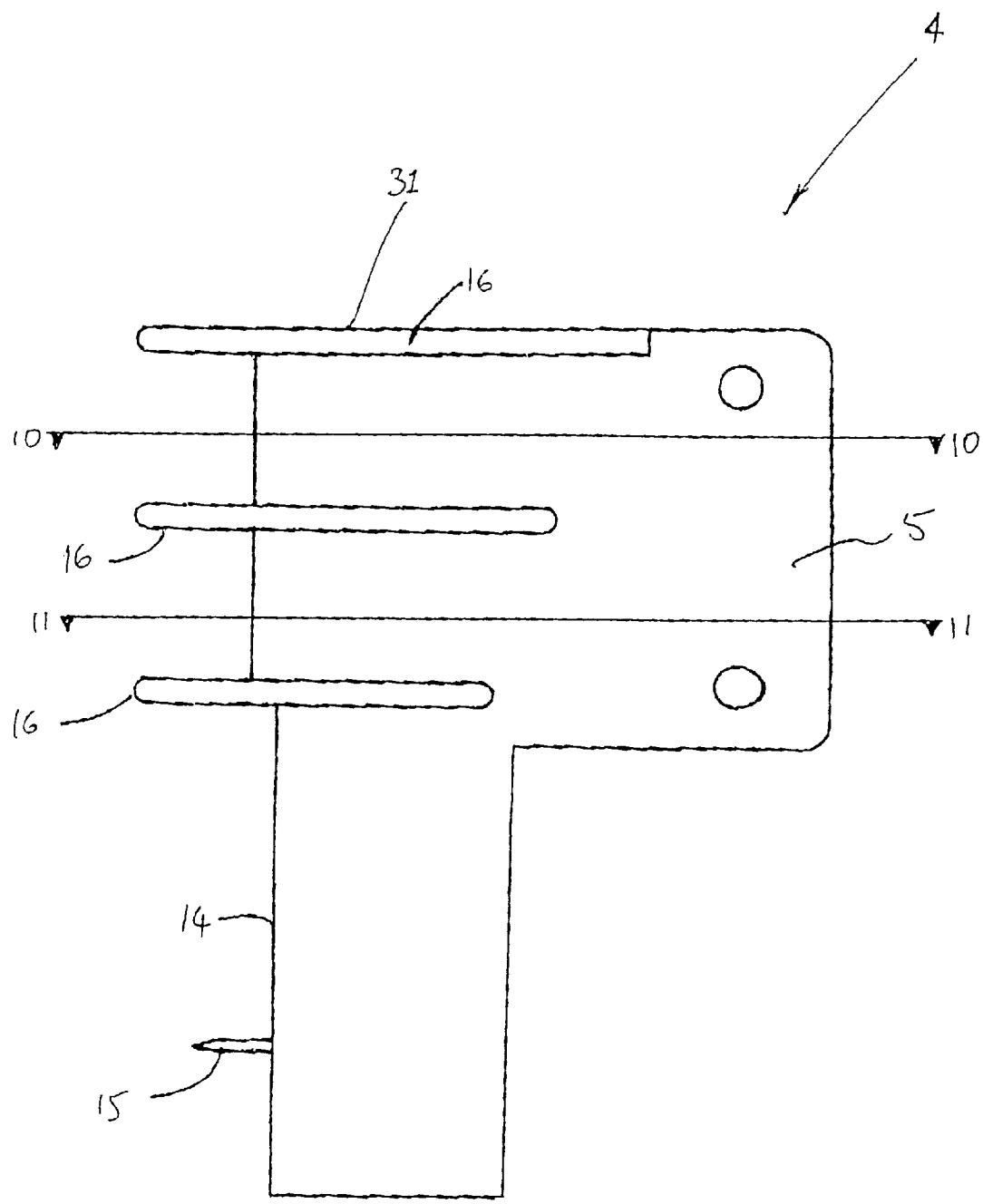
FIG. 8 is a side elevation of the pusher member of the device shown in FIG. 1.
Figure 10:
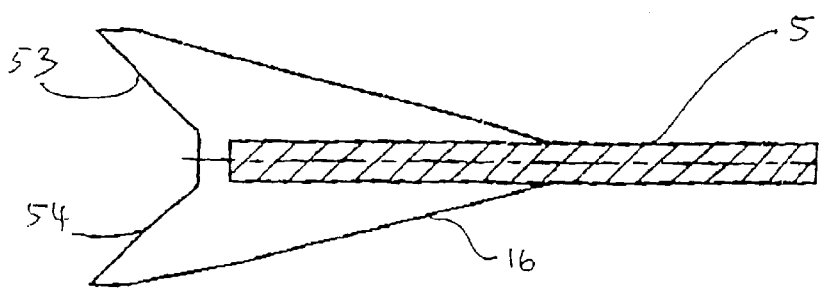
FIG. 10 is a cross-sectional view of the pusher member taken at station 10—10 in FIG. 8.
Figure 9:
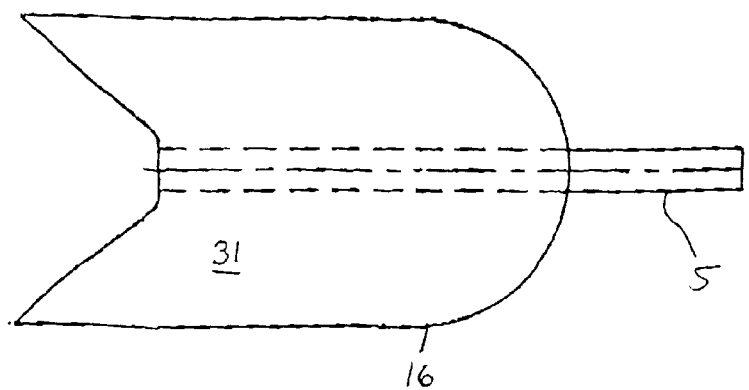
FIG. 9 is a partial plan view of the pusher member shown in FIG. 8.

FIG. 8 shows a side elevation of the pusher member 4, which consists of guide plate 5 and three spaced-apart foliage guides 16. The top broad flat surface 31 of the uppermost foliage guide 16 also acts as a plant supporting surface if a plant (not shown) is dropped while the pusher member 4 is not in its retracted (fully forward) position as shown in FIG. 1. As assembly 4 is retracted, surface 31 slides from underneath the plant and the plant then drops down into the tube 3 and plant receptacle 11 to the position of plant 8 in FIG. 2. See also FIGS. 9, 10 and 11. FIG. 9 is a partial plan view only, showing only the uppermost foliage guide 16.

Figure 12:
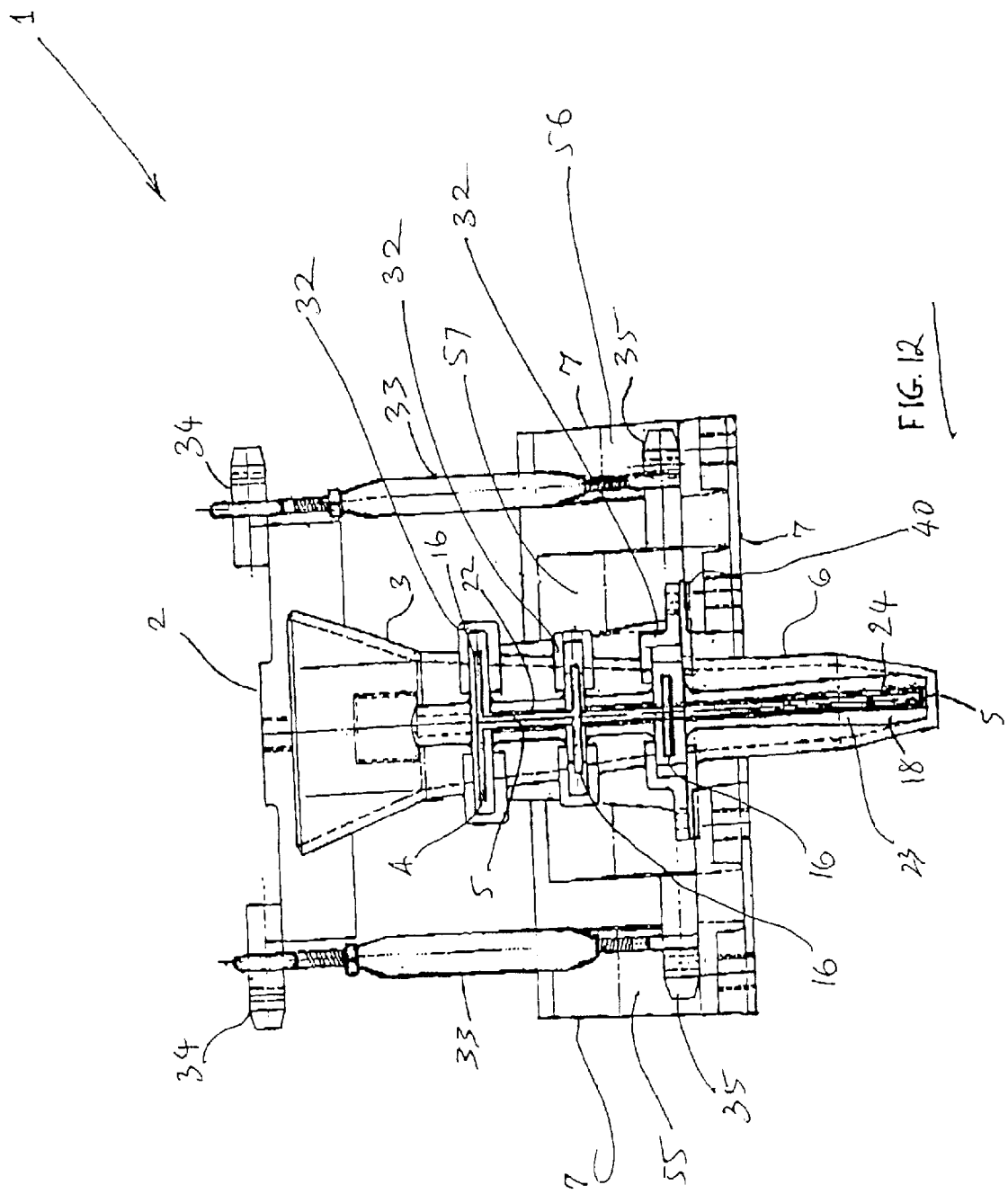
FIG. 12 is a rear view of the device shown in FIG. 1.

As best seen in FIG. 1 and FIG. 12, foliage guides 16 move forward and rearward within internally slotted formations 32 on tube 3. When retracted to the position shown in FIG. 1 and FIG. 5, foliage guides 16 allow clear access for the next plants vertical drop into shoe 6. The lower section of guide plate 5 retracts through slot 52 between the two formations 23 and 24.

As shoe 6 moves through the soil, the ski assembly 7 (FIG. 1) beds plants (such as 8) firmly into the ground on their ejection from shoe 6 and tube 3.

FIG. 12 shows an end elevation of the device 1 including the support frame 2, the plant tube 3, the shoe 6, the ski assembly 7 and the pusher member 4. The depth of planting can be altered by adjusting turnbuckles 33 between support frame 2 and the ski assembly 7, Turnbuckles 33 connect to mounting points 34 and 35 (see also FIG. 1) on the support frame 2 and ski assembly 7 respectively, and ski assembly 7 is pivotally connected to support frame 2 by pins 46. By choosing alternative pivot points 36 for pins 46, the angle of the ski 7 can be changed. FIG. 12 shows that ski assembly 7 has left and right ski parts 55 and 56 respectively, connected by a member 57. This allows shoe 6 to be mounted between parts 55 and 56.

Figure 13:
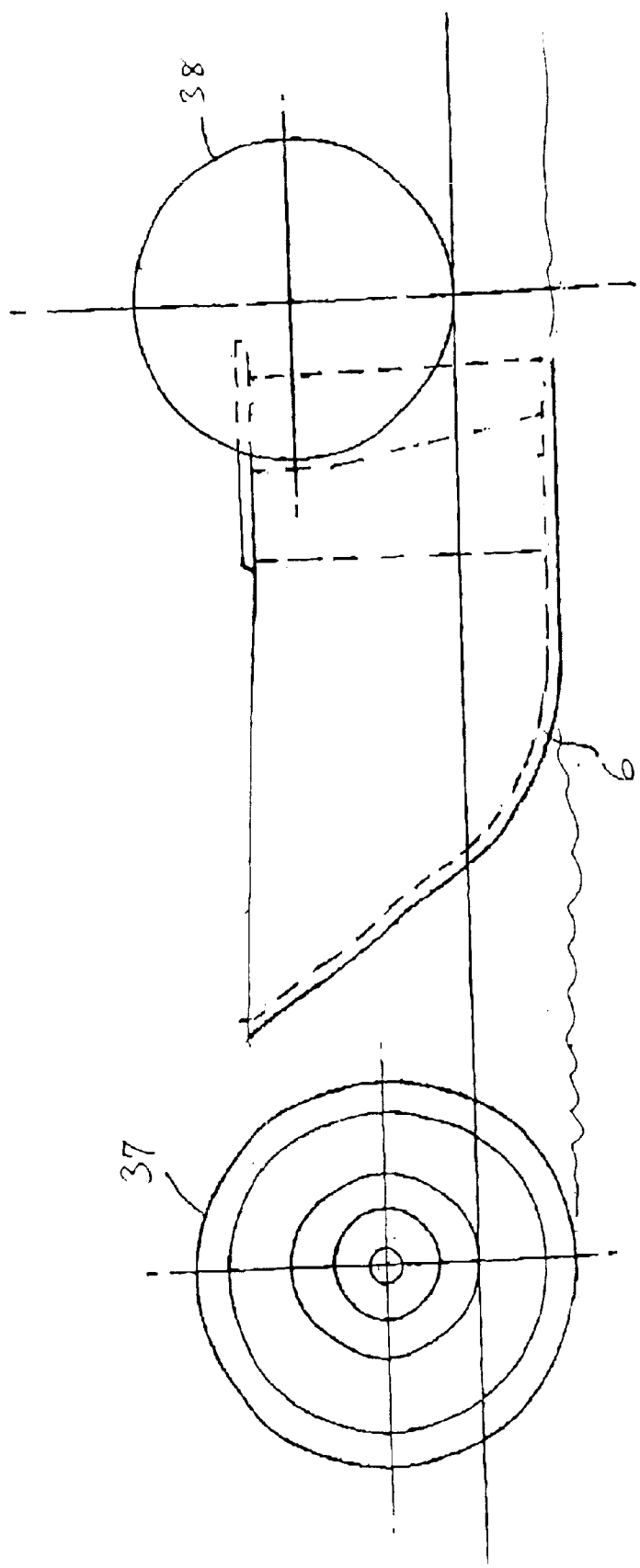
FIG. 13 is a schematic side view of the shoe only of the device shown in FIG. 1, with a coulter disc ahead located ahead of, and two conical tamping wheels located behind, the shoe.
Figure 14:
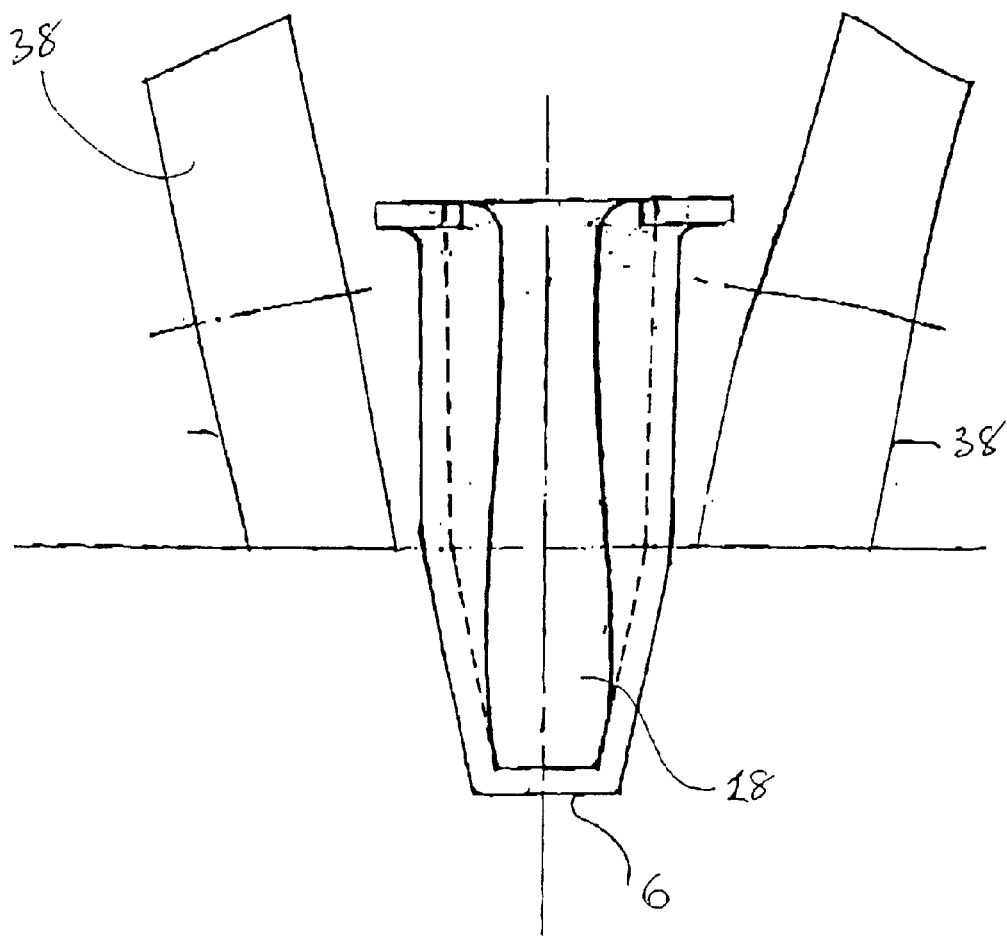
FIG. 14 is a schematic rear view of the shoe and tamping wheels shown in FIG. 13.
Figure 15:
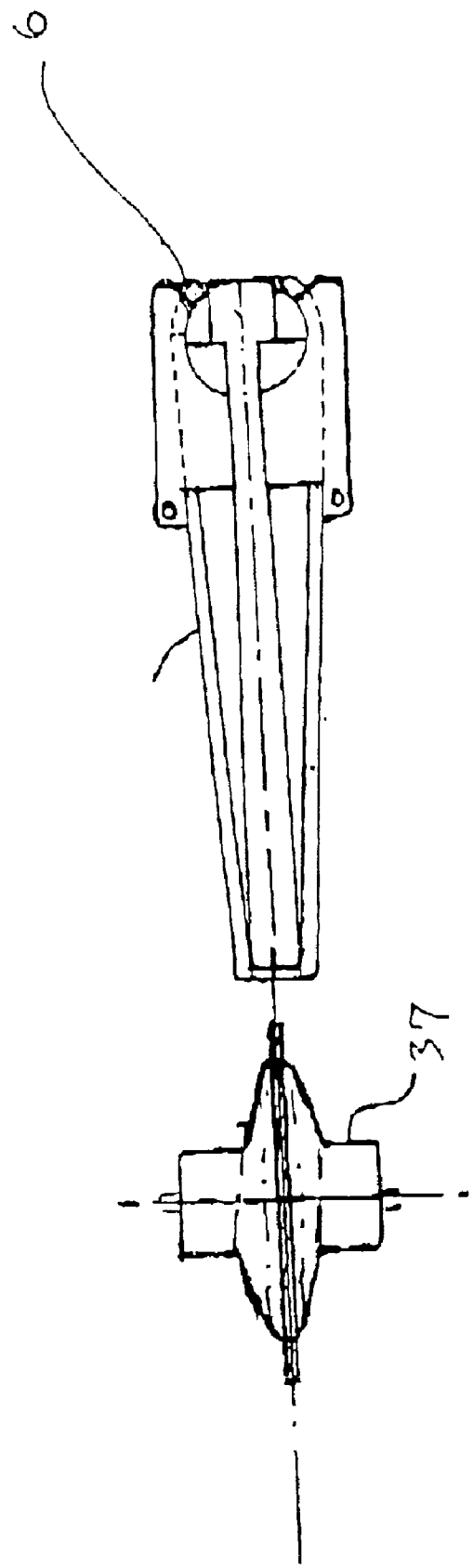
FIG. 15 is a schematic plan view of the shoe and coulter disc shown in FIG. 13.

As shown only schematically in FIG. 13, by removing the ski assembly 7, shoe 6 can also have a forward mounted coulter disc 37 which opens a furrow in the soil to assist in the ease of forward motion of the shoe 6, and a pair of conical shaped tamping wheels 38 can be mounted slightly behind and adjacent to the shoe 6 to bed plants firmly into the ground. FIG. 14, also schematic, shows a rear elevation of the shoe 6 (only) and conical shaped tamping wheels 38 as an indication of suitable positioning. FIG. 15 schematically shows the shoe 6 and the coulter disc 37 (only) again to indicate suitable positioning.

Figure 16:
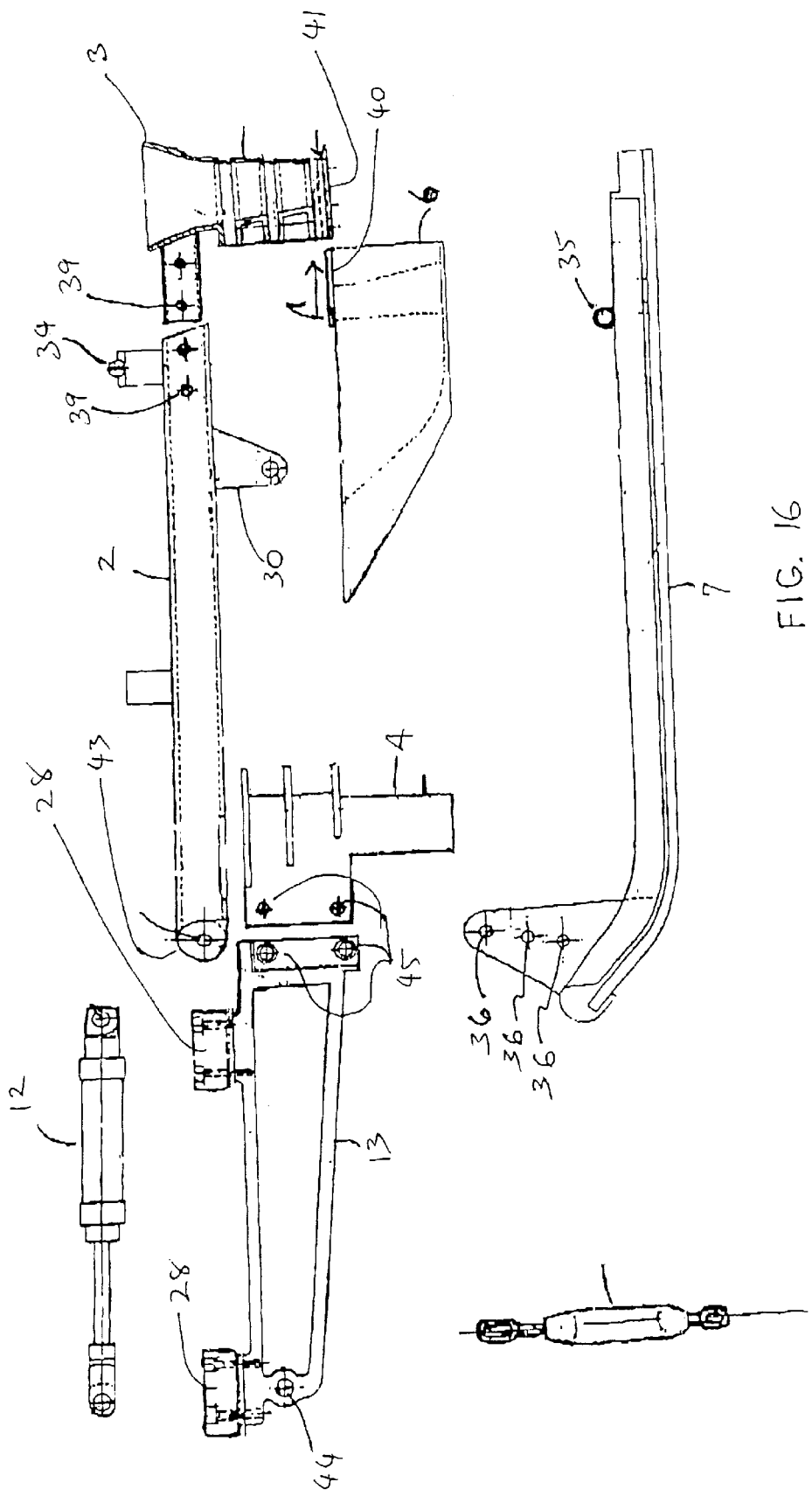
FIG. 16 is an exploded side view of the device shown in FIG. 1.

FIG. 16 is an exploded side view of device 1 to aid understanding of the relationships of its parts. The plant tube 3 connects to the support frame 2 using quick-connect pins (not shown, but such as are known in the agricultural machinery art) engaged in mating holes 39. The shoe 6 connects to the plant tube 3 by a flange 40 thereon being slid into a co-operating slot 41 in the base of plant tube 3 and is fixed by inserting pins or bolts (not shown) in holes 42 in the flange 40. The slider blocks 28 on sliding frame 13 are slideably received in support frame 2 via a front opening 43 in frame 2, and then cylinder 12 is connected to bracket 30 and to connection point 44 on slider frame 13. The pusher member 4 is connected to the slider frame by quick-connect pins (not shown) through mating holes 45. The ski assembly 7 is connected to support frame 2 as described earlier herein.

Many variations may be made without departing from the spirit or scope of the invention.

What is claimed is:

1. A field planting device adapted to pass along a ground furrow into which plants are to be sequentially placed during a planting operation, said device including:
   a plant receiving tube defining at least an upper portion of a tubular internal space adapted to receive and hold in an upright condition a plant to be planted, with a root mass plug of said plant in a lower portion of said space and foliage of said plant in the upper portion of the space, the space being partly defined by rear internal walls on laterally opposing sides of an upright rearwardly facing slot through which slot the plant passes when being ejected during a planting operation; and
   a plant eject mechanism including a pusher member actuated by a drive means, the pusher member adapted to engage both the foliage and the root mass plug of the plant when the pusher member is moved rearwardly and to eject the plant through the slot.

2. A field planting device according to claim 1 wherein the said rear walls of the internal space, at least in the upper portion thereof, extend transversely outwardly and in a forward direction from the slot.

3. A filed planting device according to claim 1 wherein that part of said slot adjacent to the upper portion of the said internal space has a width greater than that part of the slot adjacent to the lower portion of the internal space.

4. A field planting device according to claim 1 wherein that part of said slot adjacent to the lower portion of the said internal space has a maximum width no greater than a maximum width of the root mass plug of the plant.

5. A field planting device according to claim 1 wherein the said rear walls are curved adjacent the slot.

6. A field planting device according to claim 1 wherein the said rear walls are substantially flat adjacent the slot.

7. A field planting device according to claim 1 wherein the pusher member includes at least one rearwardly directed pin member adapted to be engaged in a root mass plug of a plant during ejection of the plant from the said internal space.

8. A field planting device according to claim 1 wherein the pusher member includes at least one pair of foliage engaging surfaces adapted to engage the plant foliage during ejection of the plant, each of said pair of foliage engaging surfaces extending transversely outwardly in an opposite direction from the other of said pair and each of said pair extending in a rearward direction, and wherein at least a part of each said pair of surfaces traverses the said internal space during ejection of the plant.

9. a field planting device according to claim 8 wherein each said foliage engaging surface is a surface of a part of the pusher member that during ejection of the plant enters a further opening in a said rear wall of the internal space.

10. A field planting device according to claim 8 wherein each of said pair of foliage engaging surfaces is substantially flat.

11. A field planting device according to claim 8 wherein each of said pair of foliage engaging surfaces is curved.

12. A field planting device according to claim 1 wherein the plant receiving tube is located adjacent a rearward end of a furrow forming shoe member adapted to at least assist in forming said ground furrow the lower portion of the said internal space being within the shoe member.

13. A field planting device according to claim 12 including a pair of ground engaging ski members each of the ski members being on an opposite side of the furrow forming shoe member from the other.

14. A field planting device according to claim 13 wherein the height of the ski members relative to the said shoe member is adjustable.

15. a field planting device according to claim 13 wherein the angle of said ski members relative to said shoe member is adjustable.

16. A field planting device including:
   a support frame member having an upright plant receiving tube releasably connected to a rearward end region of the support frame member;
   a planting shoe member releasably connected to a lower end of said plant receiving tube with a rearward end of said planting shoe member being configured to form a lower extension of said plant receiving tube;
   a pusher means;
   drive means for effecting fore and aft movement of said pusher means relative to said support frame member;
   said pusher means including an upper section movable at least partially through and relative to the plant receiving tube and a lower section movable at least partially through the lower extension of said plant receiving tube formed in said shoe member thereby to eject a plant from said plant receiving tube.

17. A field planting device according to claim 16 further including a pair of ski members connected to a forward region of said support frame member and located on either side of said shoe member.

18. A field planting device according to claim 17 wherein a height adjusting mechanism connects a rear end region of the ski members to the support frame member.

19. A field planting device according to claim 16 wherein said pusher means after ejection of said plant is moved forwardly by said drive means to clear said plant receiving tube for entry of a further plant.

20. A field planting device including:

a support frame member having an upright plant receiving tube releasably connected to a rearward end region of the support frame member;

a planting shoe member releasably connected to a lower end of said plant receiving tube with a rearward end of said planting shoe member being configured to form a lower extension of said plant receiving tube;

a pusher means;

drive means for effecting fore and aft movement of said pusher means relative to said support frame member;

said pusher means including an upper section adapted in use to move at least partially through the plant receiving tube and a lower section adapted in use to move at least partially through the lower extension of said plant receiving tube formed in said shoe member thereby to eject a plant from said plant receiving tube through a rear-facing slot extending upwardly in said shoe and said tube.

* * * * *